UNITED STATES PATENT OFFICE.

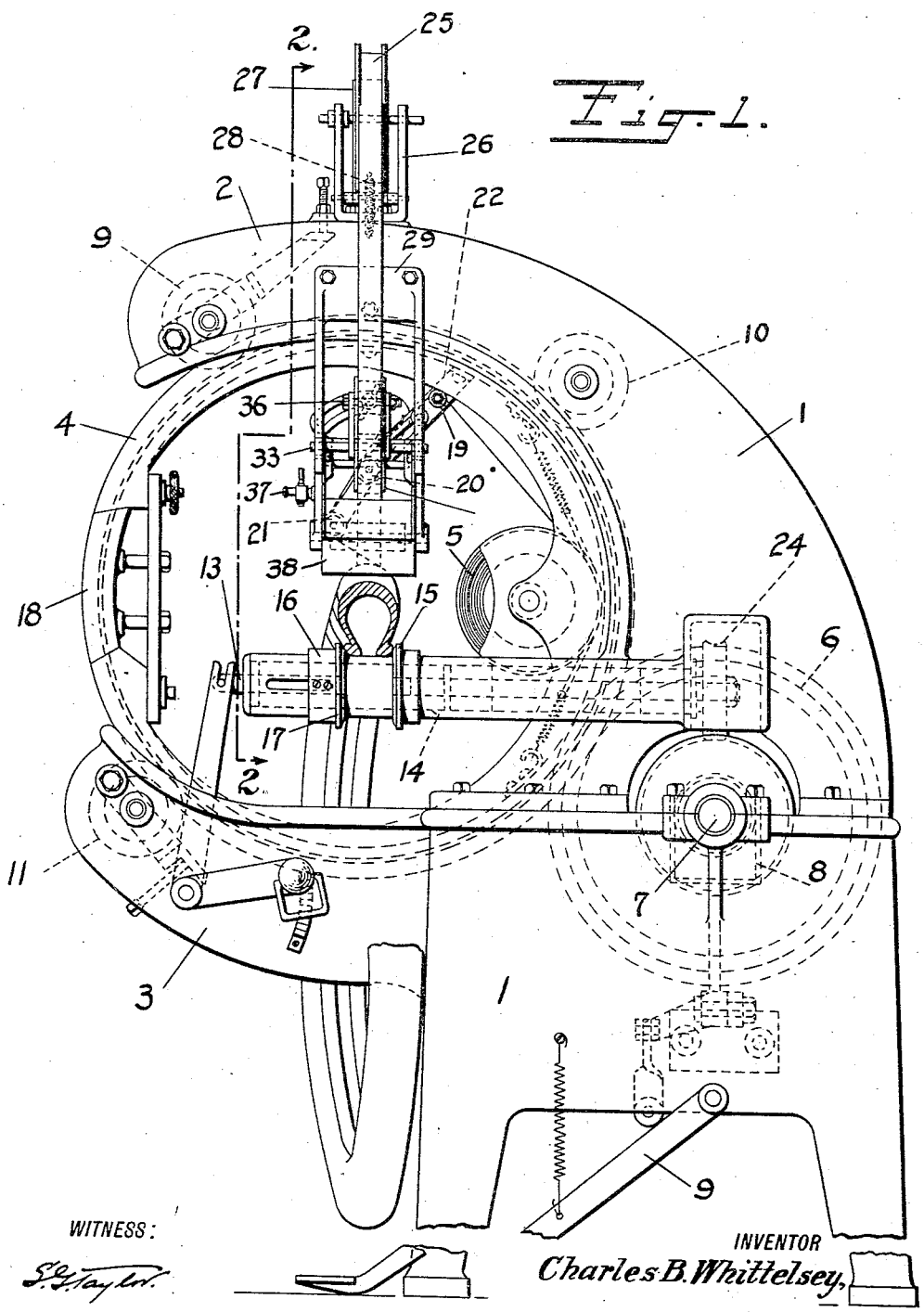

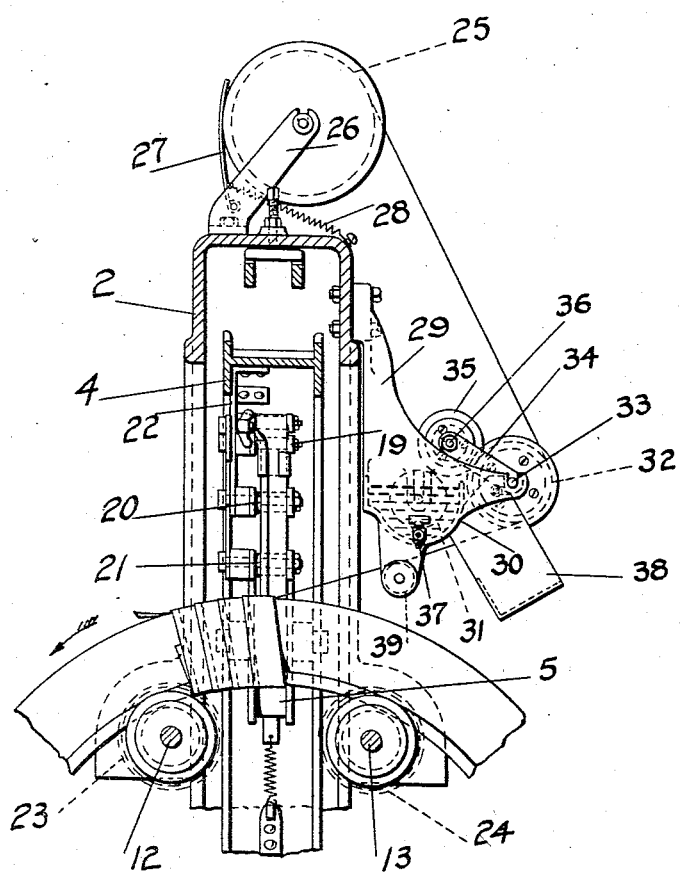

CHARLES B. WHITTELSEY, OF HARTFORD, CONNECTICUT, ASSIGNOR TO THE HARTFORD RUBBER WORKS CO., A CORPORATION OF CONNECTICUT.

WRAPPING-MACHINE.

1,286,466.     Specification of Letters Patent.     Patented Dec. 3, 1918.

Application filed March 20, 1916. Serial No. 85,295.

*To all whom it may concern:*

Be it known that I, CHARLES B. WHITTELSEY, a citizen of the United States, residing at Hartford, county of Hartford, and State of Connecticut, have invented certain new and useful Improvements in Wrapping-Machines, of which the following is a full, clear, and exact description.

This invention relates to machines for wrapping tire casings and similar articles, the wrapping of which is usually applied in spiral form.

One of the objects of my invention is to provide a machine of the type described combining a simple and inexpensive mechanism for applying to the surface of the wrapper a tearing device in the form of an adhesive strip. Another object of the invention is to provide, in conjunction with a machine comprising a strip-applying mechanism as indicated, an efficient device for applying a liquid to the strip for effecting its attachment to the wrapper.

For a detailed description of a preferred form of my invention, reference may be had to the following specification and accompanying drawings forming a part thereof, in which:

Figure 1 represents a side elevation of my improved machine, a tire shoe being shown therein partly broken away and in the act of receiving a wrapper and a tearing-strip; and Fig. 2 is a partial sectional elevation taken on line 2—2, of Fig. 1.

Referring now to the drawing the numeral 1 designates the frame of the machine, the upper portion of which is formed into two grooved jaws 2 and 3 providing a substantially circular guide way for an annular shuttle 4, mounted therein. Mounted on the inner face of the shuttle 4 is a roll of paper 5 from which the wrapper is pulled and wound about the tire upon rotation of the shuttle.

The shuttle is adapted to be driven by means of a friction wheel 6, mounted to rotate on the shaft 7, which receives power from a drive pulley acting through a friction clutch 8 and foot treadle 9. Spaced about the guide way formed by the jaws 2 and 3 are idler guide wheels 9, 10 and 11.

Disposed in parallel horizontal sleeves or bearings fixed to the frame 1 are shafts 12 and 13 upon each of which is mounted a sleeve 14 having formed integral therewith a flange 15. Beyond each flange 15 the sleeve 14 is enlarged and upon it is mounted a ring 16 adapted to slide back and forth through a plunger and an adjustable lever attachment, as shown, each ring 16 being provided with a flange 17 adapted to coact with flange 15 to hold a tire therebetween.

The tire may be inserted in place by removal of the segment 18 of the shuttle and when introduced through the opening thus made may be positioned between the flanges 15 and 17 as indicated. In this position it is adapted to receive paper from the roll 5, the paper passing over a device for turning the edge thereof and a series of guide rollers 19, 20 and 21, disposed upon a bracket and arm support 22 attached to the inner face of the shuttle 4. Upon rotation of the shuttle, paper will be fed to the tire, which will be gripped between the flanges 15 and 17 and rotated upon rotation of the shafts 12 and 13. The latter are provided with worm wheels 23 and 24 adapted to be driven by worm gears mounted on the shaft 7.

A roll of gummed paper 25 is mounted on a removable shaft carried in the slots of a bracket 26 positioned adjacent the extremity of the upper jaw 2. Tension is applied to the outer surface of the roll by means of a lever 27 held in place against the paper by a spring 28. The gummed paper wound on the roll 25 is of a material having greater tensile or tearing strength than the strip of wrapping material wound spirally about the tire. This tearing strip has an adhesive substance such as glue or paste applied to its surface, and the spiral wrappings are placed over the same when the paste or adhesive is in a moist condition. In this manner all of the convolutions or turns of the wrapper are securely fastened together to prevent slipping thereof with respect to one another. One end of the longitudinal strip is allowed to project from beneath two of the convolutions to provide an end by which the strip may be grasped when the covering is to be removed from the tire. Upon pulling this strip the convolutions of the wrapper will be torn but will adhere to the tearing strip so as to prevent the pieces of the wrapper from being scattered about.

Mounted below the roll 25 and on the side of the jaw 2 is a bracket 29 provided in the lower portion thereof with a water receptacle 30 removably mounted in which is a metal roll 31 supported in grooved slots. Held in the outer extremity of the bracket 29 is a moistening roll 32, over which the paper strip passes on its way to the tire. The flanged roll 32 is provided with an absorbent material as felt for retaining the moisture supplied thereto from the trough 30. The roll is loosely mounted on the shaft 33 and is free to adjust itself laterally with respect to the supporting arms of the bracket.

Supported intermediate rolls 31 and 32 by links 34 each having one extremity loosely fitting about the shaft 33 is a felt covered roll 35 supported by an axle 36 held by the ends of the links 34 opposite their engagement with the shaft 33. The breadth of the roll 35 is such that it may rest between and be guided by the flanges of the roll 32. The space between these flanges is approximately the same as the width of the adhesive paper, and it will readily be seen that any lateral adjustment of position of the roll 32 will automatically carry the roll 35 therewith. A pet cock 37 is provided to permit the withdrawal of water from the trough 30. A removable drip-pan 38 is also attached to bracket 29, serving to prevent any dripping on the tire being wrapped.

Water being supplied to the roll 35 by the roll 30 and thence to the absorbent surface of the roll 32, will serve to moisten the adhesive surface of the paper strip passing about the roll 32. The strip thus moistened will pass over a guide roller 39 supported by lugs depending from the trough 30 and thence will pass to a position to be attached to the paper which is being wrapped about the tire. The roll 39 is so positioned that the tearing strip is applied to the wrapper from a point to the rear (with respect to the direction of the rotation of the tire) of the point of application of the wrapper.

The devices referred to for applying the wrapper and the tearing strip are so arranged therefore that the coil of paper being wound about the tire is brought into surface contact with the adhesive strip at the instant this portion of the coil of paper is laid upon the tire.

In operating the device the tire is positioned between the flanges 15 and 17 as heretofore indicated. Paper from roll 5 is led to a position to be applied to the tire and the adhesive strip, having been moistened by turning the roll 32 for a few revolutions by hand, is brought to a position for attachment to the wrapping strip. Power is applied by means of the foot treadle 9. The wrapping of the tire by paper from the roll 5 will proceed, with the rotation of the shuttle and the simultaneous rotation of the tire, in a spiral course. The adhesive strip from the roll 25 will be attached as the wrapping progresses to the inner face of the wrapping paper, being drawn from the roll 25 as required by the rotation of the tire.

While I have described the tearing strip coming from roll 25 as an adhesive strip and the receptacle 30 as containing water I do not wish to be limited to this adaptation of the apparatus as it will be obvious that I may use a plain non-adhesive strip and that in such case the tank 30 may contain an adhesive liquid to be applied to the strip as it passes over the roll 32.

Having thus described my invention what I claim as new and desire to protect by Letters Patent is:

1. In a tire wrapping machine, in combination, a support for a tire, means to rotate the tire, means to apply a wrapper to the tire, and means to apply a moistened adhesive tearing strip to the inner surface of the wrapper from a point to the rear of the point of application of the wrapper.

2. In a tire wrapping machine, in combination, a support for a tire, means to rotate the tire, means to apply a wrapper to the tire, means to apply an adhesive tearing strip to the inner surface of the wrapper from a point to the rear of the point of application of the wrapper, said means comprising a source of supply of adhesive tearing strip and a device for applying a liquid to said strip.

3. In a tire wrapping machine, in combination, a support for a tire, means to rotate the tire, means to apply a wrapper to the tire, a source of supply of adhesive tearing strip, a liquid receptacle, a device for applying liquid to said strip to permit the attachment of the latter to said wrapping material and a guide roll adapted to direct the moistened tearing strip to a position to be applied to the wrapper from a point to the rear of the point of application of the wrapper itself to the tire.

4. In a tire wrapping machine, in combination, a frame, a support for a tire, a supply of wrapping material mounted on said frame, a supply of adhesive strip mounted on said frame, a water receptacle, a roll having absorbent material thereon dipping in said receptacle, and a moistening roll on said receptacle adapted to be moistened by said first mentioned roll and contacting with the adhesive surface of said strip adjacent the support for the tire, said strip when moistened being adapted to pass to a position between said tire and said wrapping material for attachment to the inner surface of said wrapping material.

5. In a tire wrapping machine, in combination, a frame, a support for a tire, a supply of wrapping material mounted on said frame, a supply of adhesive strip mounted on said frame, a water receptacle and a set of rolls for moistening the adhesive surface of said strip comprising a roller situated in said receptacle, a second roller having an absorbent surface coacting therewith, and a third flanged roller having an absorbent surface and serving to guide said second roller through its flanges, said third roller contacting with and moistening the adhesive side of said strip; a guide roll positioned adjacent the point of application to the tire, said strip when moistened being adapted to pass over said guide roll to a position between said tire and said wrapping material for attachment to the inner surface of said wrapping material.

Signed at Hartford, Conn., this 15th day of March, 1916.

CHARLES B. WHITTELSEY.